United States Patent Office 2,787,614
Patented Apr. 2, 1957

2,787,614

YELLOW SUBSTANTIVE AZO DYESTUFFS AND PROCESS OF MAKING THE SAME

Eugen Huber, Ottmar Wahl, and Josef Hilger, Leverkusen-Bayerwerk, Germany, assignors to Farbenfabriken Bayer Aktiengesellschaft, Leverkusen, Germany, a corporation of Germany No Drawing. Application September 21, 1954, Serial No. 457,538

Claims priority, application Germany October 1, 1953

6 Claims. (Cl. 260—178)

The present invention relates to new yellow substantive azo dyestuffs and to a process of making the same; more particularly it relates to azo dyestuffs of the type

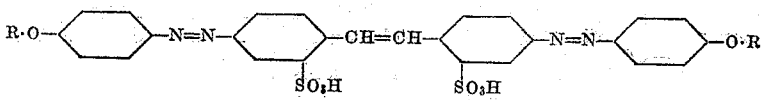

Yellow substantive azo dyestuffs of this type are known, e. g. from German Patent 42,466. Dyestuffs of this kind are known as Chrysophenine. They are obtained by coupling tetrazotized 4,4'-diaminostilbene-2,2'-disulfonic acid with 2 mols of phenols and subsequent etherifying of these disazo dyestuffs to make them fast to alkalides. In this known process alkyl halides and salts of alkyl sulfuric acids are mentioned as alkylating agents.

According to the present invention azo dyestuffs of this type, however, of improved properties are obtained by using instead of the hitherto used alkylating agents dihalogeno ethers or acetals in which the halogen atoms do not stand in neighbouring position to the ether oxygen. Such alkylating agents are e. g. 2,2'-dichloro diethyl ether, 4,4'-dichloro dibutyl ether formaldehyde-bis-(β-chloroethyl)-acetal [Cl.CH₂.CH₂.O.CH₂.O.CH₂.CH₂.Cl] or the corresponding acetaldehyde acetal. The new yellow substantive azo dyestuffs obtained by using these alkylating agents excel the dyestuffs known e. g. from German Patent 42,466 by greater brilliance of the shade particularly, however, by better fastness to wet treatment.

The new dyestuffs correspond to the general formula:

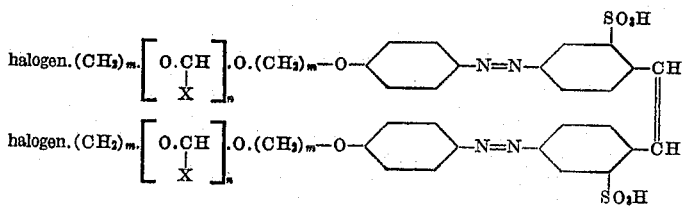

wherein X stands for hydrogen or CH₃, m means integer of at least 2, and n one of the figures 0 and 1.

The following examples illustrate the present invention without, however, limiting it thereto; the parts by weight and the parts by volume stand in the ratio of gramme to cubic centimetre.

Example 1

364 parts by weight of Brilliant Yellow (cf. G. Schultz "Farbstofftabellen," 7th edition, No. 724) as a moist about 60 percent paste are well mixed with 660 parts by volume of alcohol and 60 parts by weight of water in an autoclave. After adding 150 parts by weight of a 33 percent caustic soda solution, 70 parts by weight of sodium carbonate and 210 parts by weight of β,β'-dichloro-diethyl ether, the mixture is heated to 90–97° C. and kept at this temperature for 48–60 hours. When a sample shows no longer a change of color with sodium carbonate solution, the alcohol is blown off with steam, and the dyestuff is filtered off and dried.

The dyestuff obtained excels Chrysophenine G (cf. G. Schultz "Farbstofftabellen," 7th edition, No. 726) by a distinctly improved fastness to wet-treatment. The dyestuff corresponds as free acid to the formula

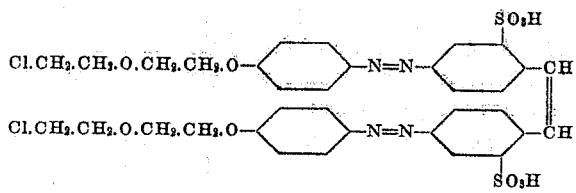

The alkylation can, if desired, also be carried out in aqueous solution without pressure. Instead of β,β'-dichloro-diethyl ether also the homologs of it may be employed.

Example 2

If in Example 1 β,β'-dichloro-diethyl ether is replaced by 260 parts by weight of formaldehyde-bis-(β-chloroethyl)-acetal, a dyestuff is obtained which also shows a distinctly improved fastness to wet-treatment. It corresponds as free acid to the formula:

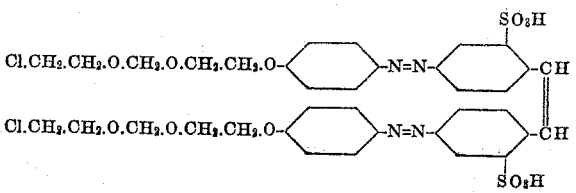

We claim:

1. In the process of making yellow substantive azo dyestuffs by alkylating disazo dyestuffs obtained from tetrazotized 4,4'-diaminostilbene-2,2'-disulfonic acid and 2 mols of monohydroxy benzene the step which consists in alkylating with dichloro compounds selected from the group consisting of dichloro ethers and acetals the chlorine atoms of which are in a position other than alpha to the ether oxygen atom.

2. In the process of making yellow substantive azo dyestuffs by alkylating disazo dyestuffs obtained from tetrazotized 4,4'-diaminostilbene-2,2'-disulfonic acid and 2 mols of monohydroxy benzene the step which consists in alkylating with 2,2'-dichloro diethyl ether.

3. In the process of making yellow substantive azo dyestuffs by alkylating disazo dyestuffs obtained from tetrazotized 4,4'-diaminostilbene-2,2'-disulfonic acid and 2 mols of monohydroxy benzene the step which consists in alkylating with Cl.CH₂.CH₂.O.CH₂.O.CH₂.CH₂.Cl.

4. Yellow substantive azo dyestuffs corresponding as free acids to the formula:

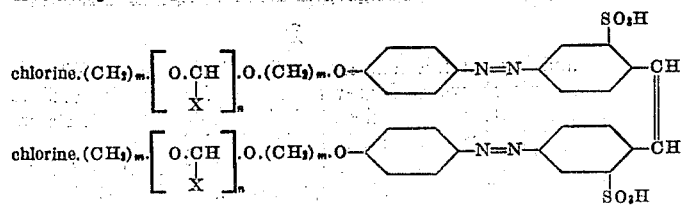

wherein X stands for a radical selected from the group consisting of hydrogen and methyl, m means an integer of at least 2 and n one of the figures 1 and 0.

5. The yellow substantive azo dyestuff corresponding as free acid to the formula:

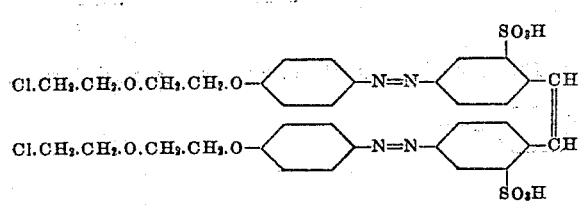

6. The yellow substantive azo dyestuff corresponding as free acid to the formula:

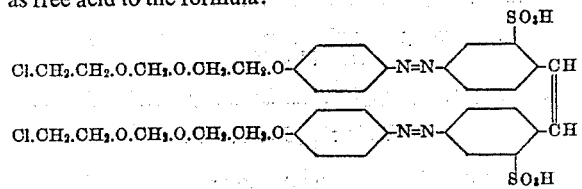

References Cited in the file of this patent

UNITED STATES PATENTS

| | | |
|---|---|---|
| 1,975,830 | Dahlen | Oct. 9, 1934 |
| 2,568,579 | Coleman | Sept. 18, 1951 |

FOREIGN PATENTS

| | | |
|---|---|---|
| 3,994 | Great Britain | of 1887 |